(12) United States Patent
Bootsveld et al.

(10) Patent No.: US 11,085,569 B2
(45) Date of Patent: Aug. 10, 2021

(54) THERMAL AND ANTI-VIBRATION PIPE SUPPORT

(71) Applicant: BMA SOLUTIONS INC., Houston, TX (US)

(72) Inventors: Timothy Bootsveld, Calgary (CA); Jaehee Chae, Calgary (CA); Carol Palynchuk, Calgary (CA); Chris Harper, Calgary (CA)

(73) Assignee: BMA Solutions Inc., Houston, TX (US)

( * ) Notice: Subject to any disclaimer, the term of this patent is extended or adjusted under 35 U.S.C. 154(b) by 0 days.

(21) Appl. No.: 16/457,034

(22) Filed: Jun. 28, 2019

(65) Prior Publication Data

US 2020/0003351 A1    Jan. 2, 2020

Related U.S. Application Data

(60) Provisional application No. 62/691,741, filed on Jun. 29, 2018.

(51) Int. Cl.
*F16L 55/035* (2006.01)
*F16L 3/10* (2006.01)
*F16L 3/20* (2006.01)

(52) U.S. Cl.
CPC ........... *F16L 55/035* (2013.01); *F16L 3/1008* (2013.01); *F16L 3/20* (2013.01)

(58) Field of Classification Search
CPC ......... F16L 55/035; F16L 3/1008; F16L 3/20; F16L 3/24

(Continued)

(56) References Cited

U.S. PATENT DOCUMENTS 3,963,205 A    6/1976  Hageman
4,530,478 A    7/1985  McClellan
(Continued)

FOREIGN PATENT DOCUMENTS

CA    2950070    5/2018

OTHER PUBLICATIONS

International Search Report and Written Opinion dated Sep. 30, 2019 for related International Application No. PCT/US2019/039856 filed Jun. 28, 2019 (14 pages).

(Continued)

*Primary Examiner* — Muhammad Ijaz
(74) *Attorney, Agent, or Firm* — Ronald J. Richter; Hasse & Nesbitt LLC

(57) ABSTRACT

A pipe support system is disclosed for protecting industrial piping from fatigue and failure caused by vibrational and thermal forces. The inventive slide bearing pipe support system can accommodate thermal expansion and/or contraction of the pipe under high magnitude thermal loads while resisting movement of the pipe under low magnitude vibratory loads. The frictional force required to resist vibratory movement but to permit thermal movement is dependent upon the torque load provided by bolts connecting upper, lower and central slide bearing plates. The torque on these bolts is specified to generate a specific frictional force between the contact layers of the slide bearing plates, which can resist vibration of the piping under a vibratory load but permit lateral/transverse movement of the pipe under a thermal load. The inventive support system is useful for a variety of vibrational and thermal loads, and with a variety of industrial pipe sizes.

10 Claims, 9 Drawing Sheets

(58) Field of Classification Search
USPC .............................................. 248/72, 55, 49
See application file for complete search history.

(56) References Cited

U.S. PATENT DOCUMENTS

| | | | |
|---|---|---|---|
| 4,951,902 | A | 8/1990 | Hardtke |
| 5,044,584 | A | 9/1991 | Lin |
| 6,729,588 | B2 | 5/2004 | Wilkinson, III |
| 7,213,790 | B2 | 5/2007 | Bailey et al. |
| 7,467,766 | B2 | 12/2008 | Pothanikat et al. |
| 7,861,983 | B2 | 1/2011 | Lange et al. |
| 7,950,609 | B2 | 5/2011 | Pothanikat et al. |
| 7,997,541 | B2 | 8/2011 | Pothanikat et al. |
| 8,505,857 | B2 | 8/2013 | Mark et al. |
| 9,732,886 | B2 | 8/2017 | Simmons et al. |
| 9,739,398 | B2 | 8/2017 | Costa |
| 2012/0181396 | A1* | 7/2012 | Simmons .................. F16L 3/18 248/72 |
| 2016/0047496 | A1* | 2/2016 | O'Connell ................ F16L 3/08 248/72 |
| 2020/0003351 | A1* | 1/2020 | Bootsveld ............. F16L 3/1008 |

OTHER PUBLICATIONS

First Examination Report dated Nov. 18, 2020 in related Australian Application No. 2019291923 filed Nov. 10, 2020 (5 pages).
First Office Action dated Dec. 14, 2020 in related Canadian Application No. 3,099,331 filed Nov. 3, 2020 (7 pages).
International Preliminary Report on Patentability (Chapter I) dated Dec. 29, 2020 in related International Application No. PCT/US2019/039856 filed Jun. 28, 2019 (9 pages).
European Patent Application No. 19744971.3, Office Action dated Apr. 14, 2021, 6 pages.
Second Office Action dated May 6, 2021 in related Canadian Application No. 3,099,331 filed Nov. 3, 2020 (6 pages).

* cited by examiner

THERMAL AND ANTI-VIBRATION PIPE SUPPORT

CROSS-REFERENCE TO RELATED APPLICATION

This application claims the benefit of U.S. Provisional Application No. 62/691,741, filed Jun. 29, 2018, the disclosure of which is hereby incorporated by reference in its entirety.

FIELD OF THE INVENTION

The present invention relates in general to supporting industrial piping which may be subject to both high magnitude low-cycle and low magnitude high-cycle loads, and in particular to an apparatus for allowing a length of pipe to move under a thermal load while resisting vibration under a vibratory load.

BACKGROUND OF THE INVENTION

Industrial installations which make use of extensive pipeline transportation, such as power plants, chemical plants, and oil and gas production facilities, generally require large amounts of piping and pipe supporting structures. The piping in these installations is subject to both the temperature of the gases and liquids that they transport and the temperatures of their surrounding environment, whether interior or exterior. Varying high and low temperatures induce the piping to expand or contract in length, respectively, from its ambient state. The use of static pipe supports in an attempt to restrain the pipe from expanding or contracting can cause very high pipe stresses and can result in failure of the pipe. Therefore, pipes subject to thermal loads require supports which allow for axial and/or lateral movement of the piping in order to prevent excessive stress buildup. To facilitate such axial and lateral pipe movement, it has been the practice to utilize support devices which minimize the restraint stiffness between the pipe and the I-beam or undergirding structure.

In addition to thermal or low-cycle loads, industrial piping installations are also subject to vibrational or high-cycle loads. Harmful oscillations or vibrations traveling within piping can be caused by many different mechanisms. Non-limiting examples include mechanically-induced, pulsation-induced, flow-induced and acoustically-induced oscillations or vibrations originating from coupled process machinery. Since even small oscillatory displacements can lead to fatigue failure in piping subject to constant vibratory loads, pipe supports designed to minimize vibratory stress must resist pipe movement. In this pursuit, current industrial pipe supports resist pipe vibratory movement by maximizing the restraint stiffness between the support and the pipe.

Previously, piping subjected to thermal loading has typically accommodated pipe migration with a single planar slide bearing, implemented between the pipe support and the undergirding structure. This bearing may have steel-on-steel slide action, but specialty materials and lubricants have also been used, such as blocks of graphite or polytetrafluoroethylene (PTFE) used for low-friction slide surfaces, or molybdenum-based lubricants. The supports typically take the form of "pipe shoes" which are bolted or welded to the pipe. The shoes rest on the undergirding structure, such that the slide bearing is only loaded with the weight of the pipe. The friction between the support and the undergirding structure can easily be overcome by thermal loads, allowing the pipe to freely expand and contract. These supports, while accomplishing the aims of thermal growth designers, do not provide adequate stiffness and restraint to control vibration for pipes in vibratory service. Although vibratory loads are typically an order of magnitude (i.e. 10 times) less than thermal loads, they are still typically of a large enough magnitude that they are able to overcome the friction of the slide bearing. When this occurs, vibration is uncontrolled, and excessive vibration can lead to fatigue failures of the main pipe itself, or of the smaller-bore piping branches attached to the main pipe.

A typical prior art thermal pipe shoe 10 is shown in FIGS. 1A and 1B, and includes a base 12 for interconnecting a lower semi-circular clamp 16 to an upper semi-circular clamp 18. The lower clamp 16 is welded to or otherwise fixed to the base 12, so that the connected clamps 16, 18 support the pipe 15. The base 12 may slide along the planar upper surface of a structural support 20 beneath, such as a supporting I-beam 20, as the process pipe expands or contracts in length. The lower clamp half 16 is typically welded to the base 12, so that the weight of the pipe is supported on the generally lower clamp 16. Ears project radially outward from both the lower and upper clamp 16, 18, and a pair of conventional bolts 14 interconnects the mating radially-opposing ears to secure the piping to the pipe shoe. The structural support 20 and the base 12 may each include a slide plate 21 and 22, respectively. Slide plates 21, 22 are commonly steel on steel, but low-friction materials such as polytetrafluoroethylene (PTFE, or Teflon) may be added depending on the application. Note that there is nothing holding the pipe support base 12 to the I-beam 20 except for the gravity load. If the lateral thermal load at the support exceeds the frictional force between the slide plates 21, 22, the base 12 will slip along the slide plates, allowing the pipe to move to accommodate the thermal load.

A typical prior art anti-vibration pipe support 30 is shown in FIG. 2. Because this style of support is in rigid contact with the undergirding structure 20, support 30 is generally stiff and resists movement of the pipe. A typical hold-down clamp 32 is usually bolted or welded to the pipe and then bolted down to the undergirding structure or I-beam 20. While the connection of the support 30 to the I-beam 20 is strong enough to resist vibratory loads, the rigidity of these prior art supports typically prevent pipe movement and fail to accommodate thermal expansion or contraction of the pipes. Since the support 30 is bolted down to the I-beam 20 and is therefore active in holding the pipe to the I-beam, any lateral movement of the pipe prompted by a thermal load is resisted by the support. Resisting thermal expansion, as these clamps do, can lead the pipe, the support, the structure, and all connective hardware to experience high stress, and are all possible subjects of failure. When pipe stress engineers utilize such prior art anti-vibration pipe supports in their models, many applications will predict high stresses in the system, such that additional piping geometries called "piping loops" are needed to reduce those stresses. These piping loops require more pipes, more space, and generally end up causing vibration problems themselves.

In light of the above, there remains a need in the art for improved industrial pipe supporting structures. It would therefore be useful to provide a novel pipe support that allows a length of pipe to move laterally under a thermal load while resisting movement under a vibratory load. It would also be useful to provide a thermal and anti-vibration pipe support system capable of use with a variety of different loads and pipe sizes, which permits both free axial and lateral movement of the pipe.

SUMMARY OF THE INVENTION

The present invention provides an industrial pipe support system for protecting the piping from fatigue and failure caused by vibrational and thermal forces.

A first aspect of the invention relates to a slide bearing pipe support for providing thermal and anti-vibrational support for industrial piping, the pipe support comprising: (a) an upper slide bearing plate; (b) a central slide bearing plate; and (c) a lower slide bearing plate, wherein the pipe support connects a length of piping to a structural support via a plurality of threaded bolts, wherein the upper slide bearing plate, the central slide bearing plate and the lower slide bearing plate are brought into sliding, frictional contact with one another upon application of a torque force by the threaded bolts, wherein movement of the central slide bearing plate with respect to the upper and lower slide bearing plates occurs when a force applied to the piping overcomes a frictional force between the upper slide bearing plate, the central slide bearing plate and the lower slide bearing plate, and wherein said frictional force resists movement of the piping under a vibratory load but allows the piping to expand and contract under a thermal load.

A second aspect of the invention relates to a slide bearing pipe support for providing thermal and anti-vibrational support for industrial piping, the pipe support comprising: (a) an upper slide bearing plate; (b) a central slide bearing plate; and (c) a lower slide bearing plate, wherein the pipe support connects a length of piping to a structural support via a plurality of threaded bolts, the structural support including a horizontal support surface with a top side and an underside, wherein the upper slide bearing plate comprises the length of piping secured perpendicularly to the structural support by a clamp, wherein the central slide bearing plate comprises the combination of: (i) a fixed upper slide pad mechanically adhered to the top side of the support surface of the structural support; (ii) the structural support; and (iii) a pair of fixed lower slide pads mechanically adhered to the underside of the support surface of the structural support, wherein the lower slide bearing plate comprises a pair of floating lower slide pads centered beneath the pair of fixed lower slide pads, each of the fixed lower slide pads including a lip to maintain a fixed orientation with its corresponding floating lower slide pad, wherein the upper slide bearing plate, the central slide bearing plate and the lower slide bearing plate are brought into sliding, frictional contact with one another upon application of a torque force by the threaded bolts, wherein movement of the central slide bearing plate with respect to the upper and lower slide bearing plates occurs when a force applied to the piping overcomes a frictional force between the upper slide bearing plate, the central slide bearing plate and the lower slide bearing plate, and wherein said frictional force resists movement of the piping under a vibratory load but allows the piping to expand and contract under a thermal load.

A third aspect of the invention relates to a slide bearing pipe support for providing thermal and anti-vibrational support for industrial piping, the pipe support comprising: (a) an upper slide bearing plate; (b) a central slide bearing plate; and (c) a lower slide bearing plate, wherein the pipe support connects a length of piping to a structural support via a plurality of threaded bolts, the structural support including a horizontal support surface with a top side and an underside, wherein the upper slide bearing plate comprises a fixed upper slide pad, wherein the central slide bearing plate comprises the combination of: (i) a pipe shoe having a base with a top side and an underside; (ii) a floating upper slide pad centered on the tope side of the base; and (iii) a floating lower slide pad centered beneath the floating upper slide pad on the underside of the base, wherein the lower slide bearing plate comprises a fixed lower slide pad centered on the top side of the horizontal support surface, wherein the upper slide bearing plate, the central slide bearing plate and the lower slide bearing plate are brought into sliding, frictional contact with one another upon application of a torque force by the threaded bolts, wherein movement of the central slide bearing plate with respect to the upper and lower slide bearing plates occurs when a force applied to the piping overcomes a frictional force between the upper slide bearing plate, the central slide bearing plate and the lower slide bearing plate, and wherein said frictional force resists movement of the piping under a vibratory load but allows the piping to expand and contract under a thermal load.

While the nature and advantages of the present invention will be more fully appreciated from the following drawings and detailed description, showing the contemplated novel construction, combinations and elements as herein described, and more particularly defined by the appended claims, it is understood that changes in the precise embodiments of the present invention are meant to be included within the scope of the claims, except insofar as they may be precluded by the prior art.

DETAILED DESCRIPTION OF THE INVENTION

Figure 1A:
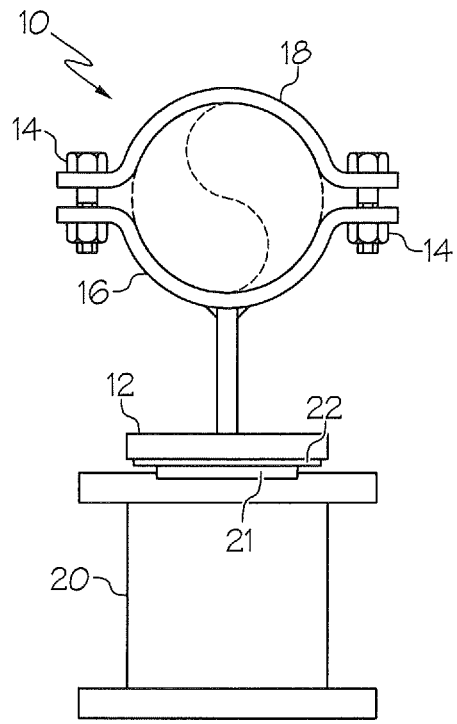
FIGS. 1A and 1B are schematic frontal and side views, respectively, of a prior art thermal pipe support.
Figure 1B:
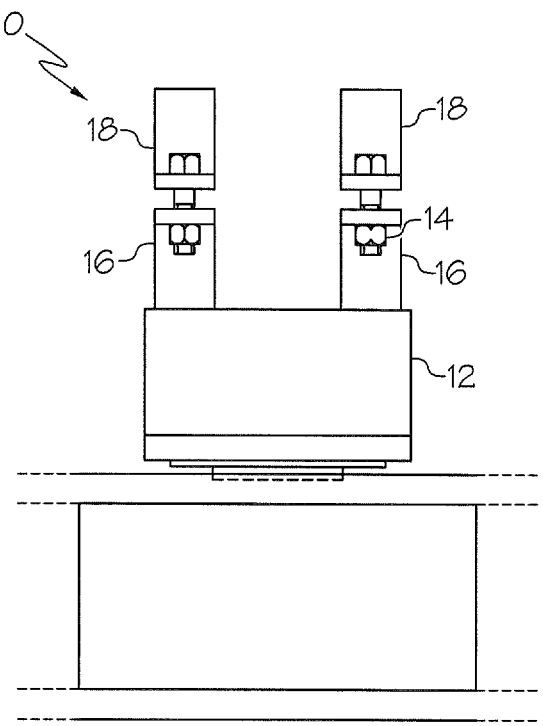
Figure 2:
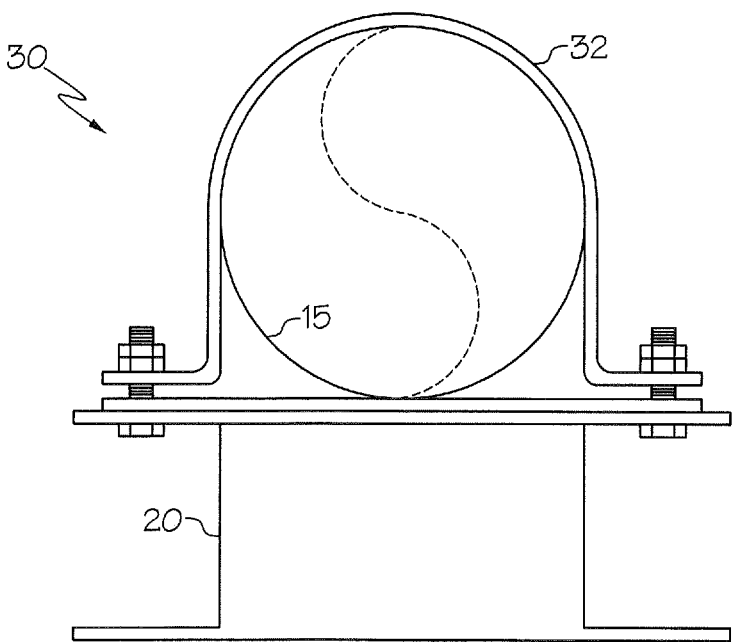
FIG. 2 is a schematic frontal view of a prior art vibration clamp.
Figure 3:
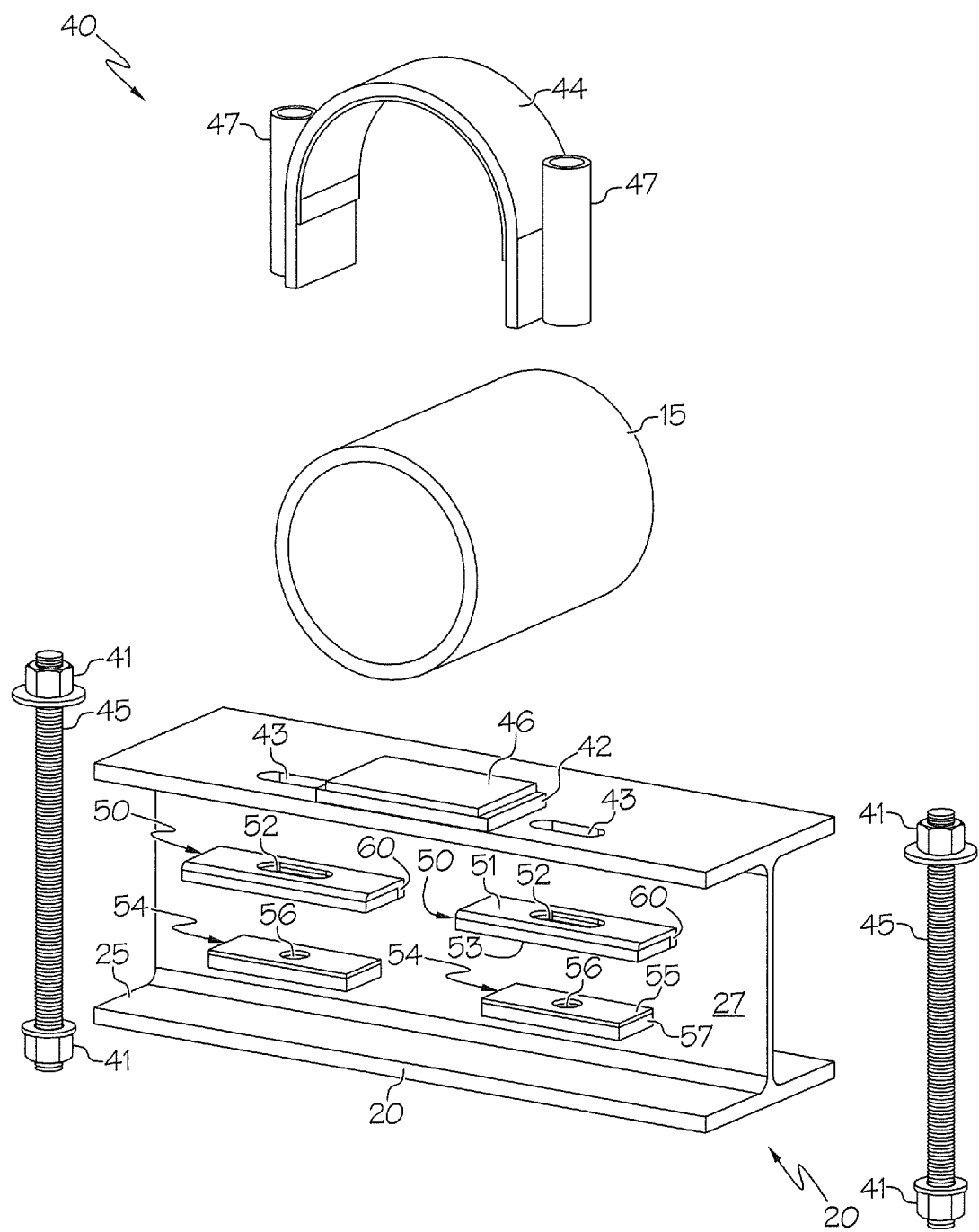
FIG. 3 is an exploded view of a first embodiment of a pipe support system according to the present invention.
Figure 4:
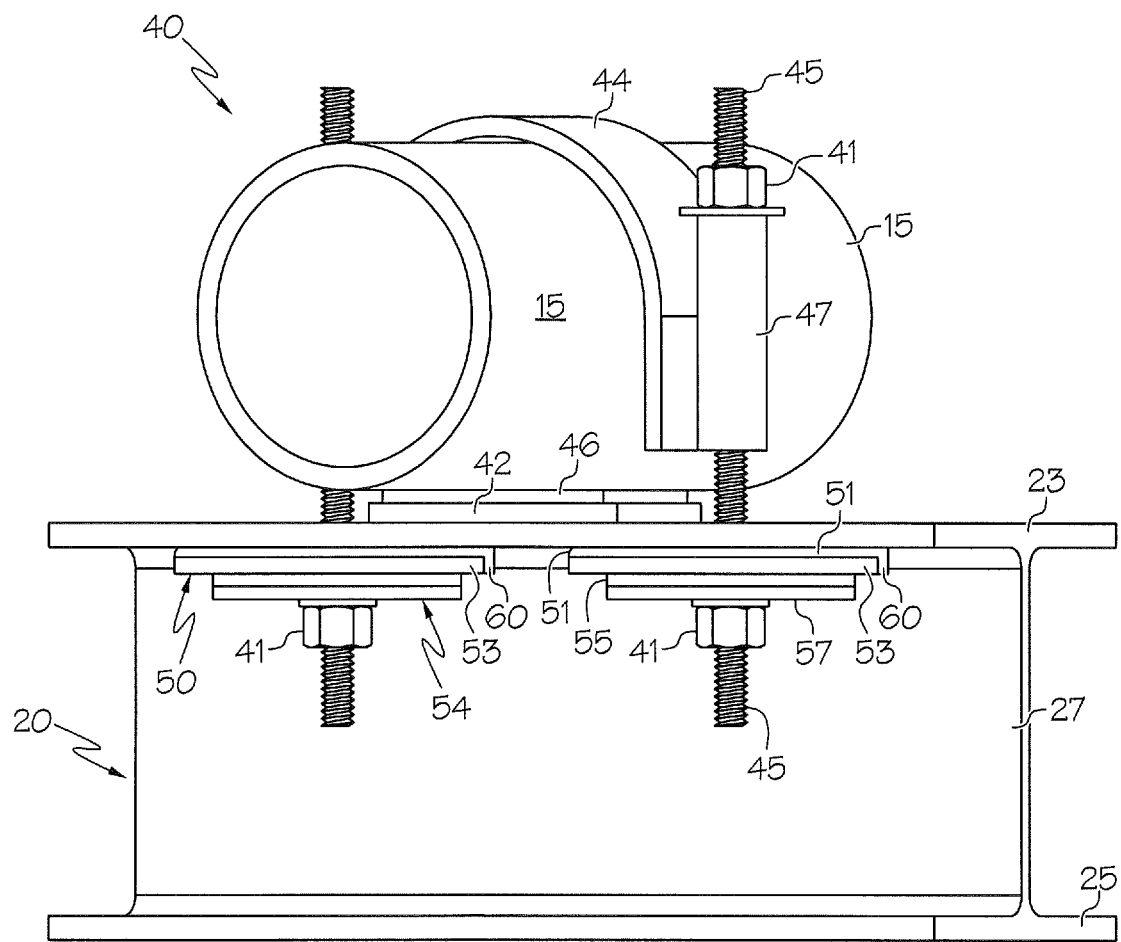
FIG. 4 is a perspective view of an assembled embodiment of FIG. 3.
Figure 5A:
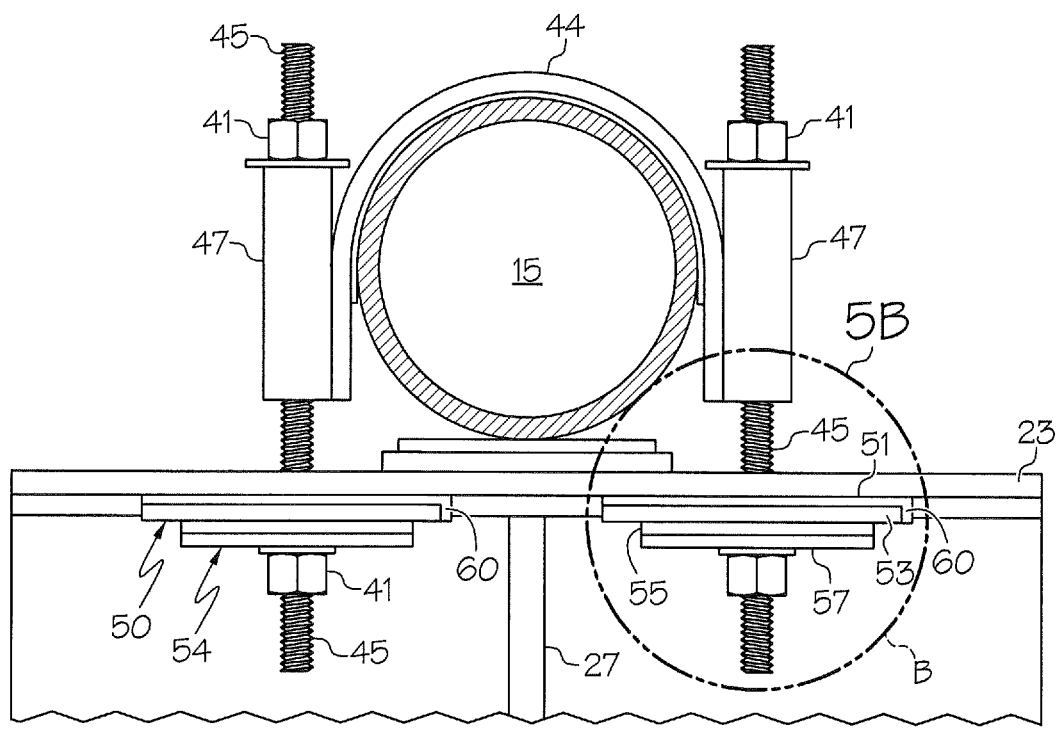
FIG. 5A is a frontal view of the assembled embodiment of FIG. 4.
Figure 5B:
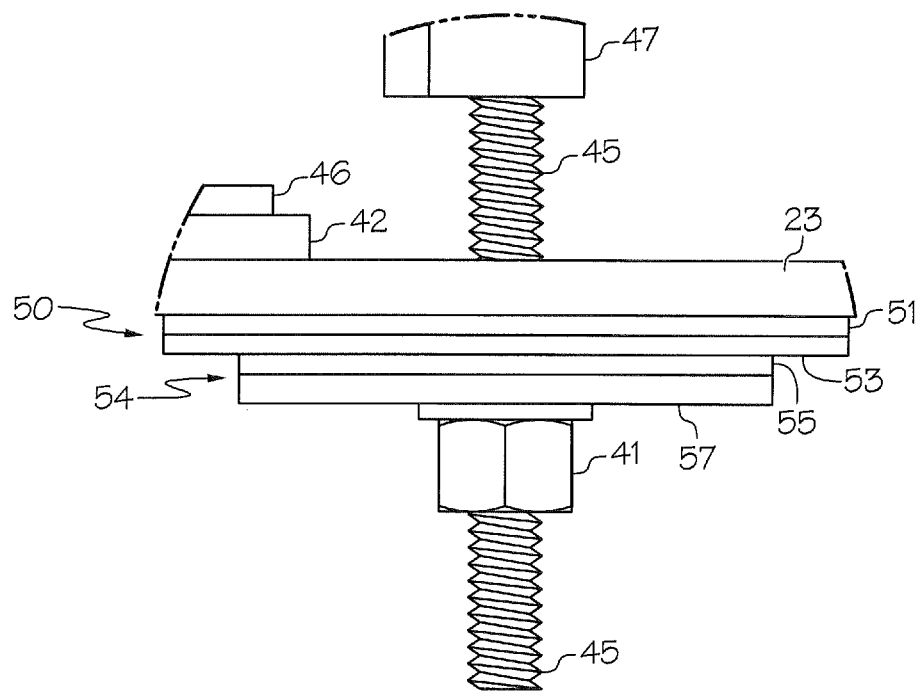
FIG. 5B is a detailed view of circled area B of FIG. 5.
Figure 6:
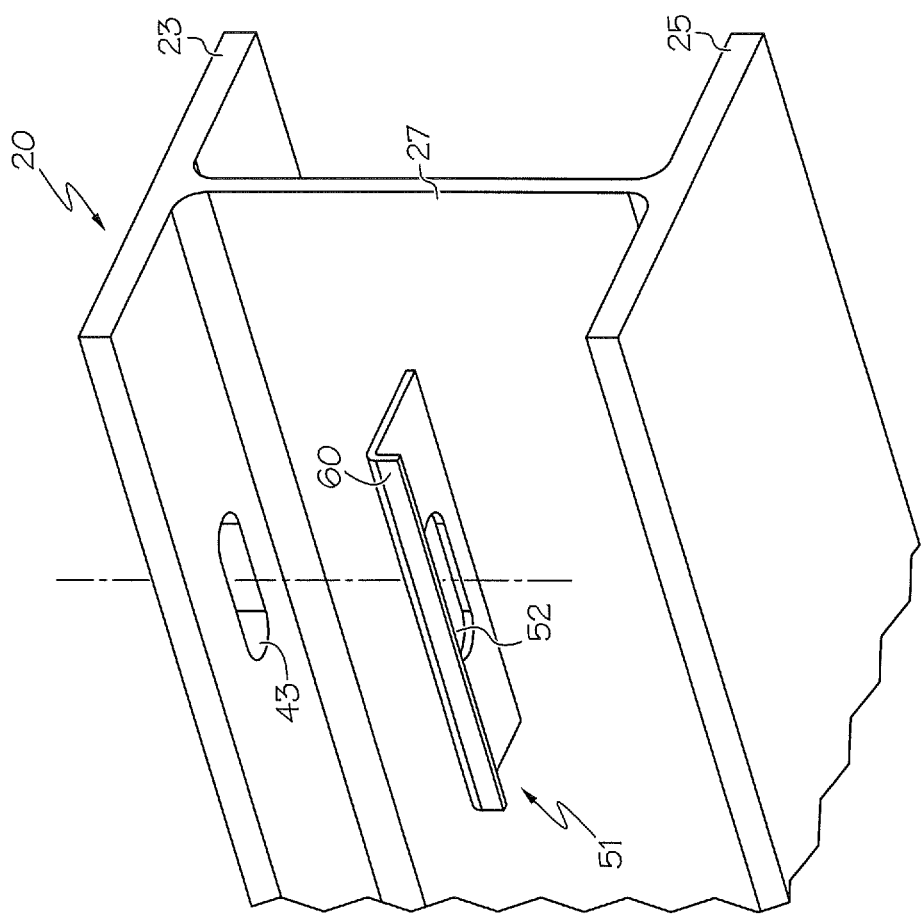
FIG. 6 is a perspective view showing alignment of a the fixed lower slide pad with the underside of an I-beam flange according to the present invention.
Figure 7:
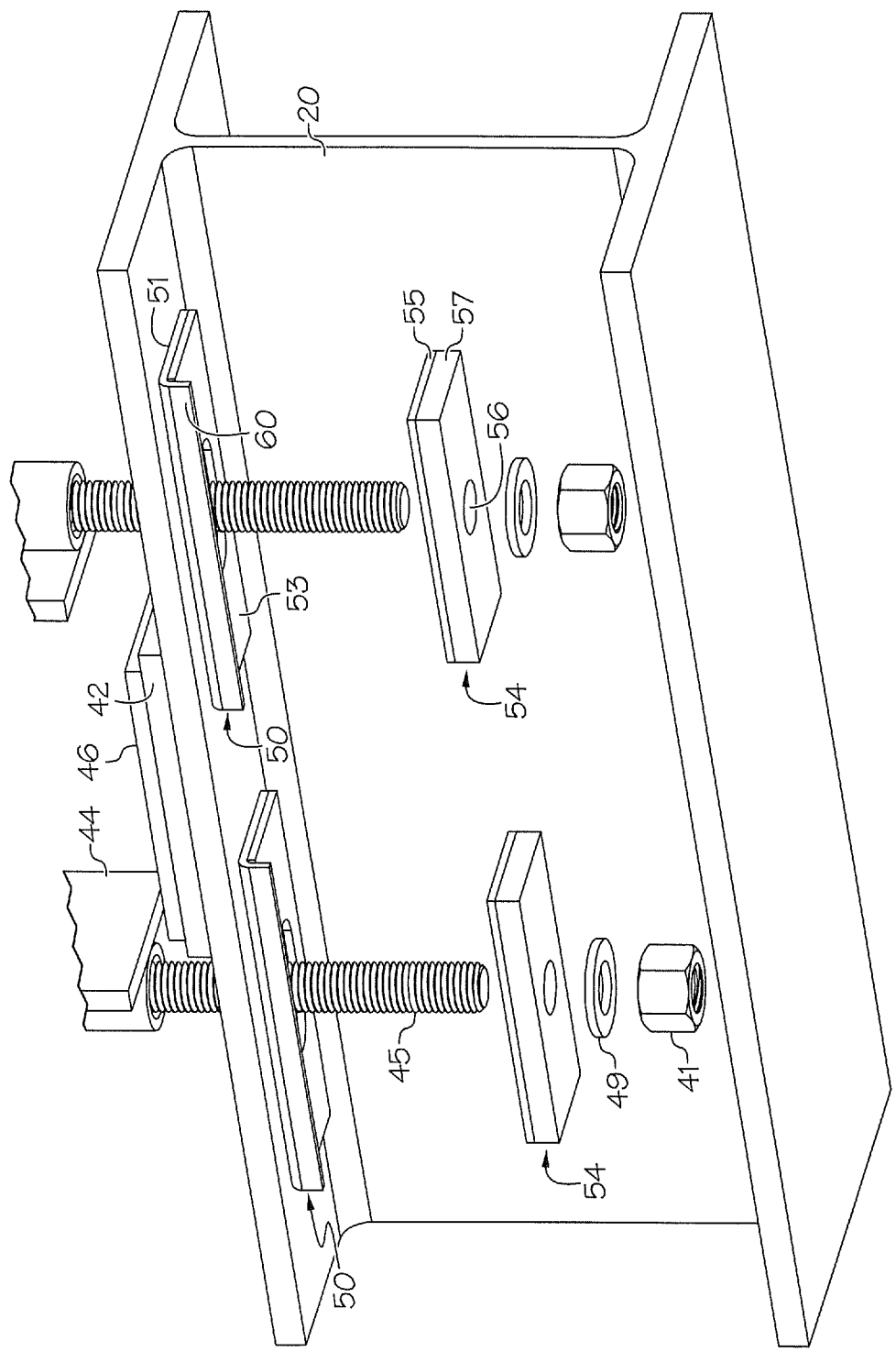
FIG. 7 is an exploded perspective view showing placement of a floating lower slide pad beneath the fixed lower slide pad of FIG. 6 to create a lower slide plane.

As used herein the term "structural support", "undergirding structure", or "I-beam" means a supporting framework having at least one upright central web with a horizontal upper flange. Typically the structural support for use with the present invention is an elongate I-beam (wide flange beam) having an upright central web between a horizontal upper flange and a horizontal lower flange. Piping is arranged perpendicularly to the I-beams, which can support long lengths of industrial piping. One of skill in the art, upon reviewing the present disclosure and accompanying drawings, will readily understand how to select and/or construct an appropriate structural support.

The problem solved by the present invention relates to fatigue and failure of industrial piping over time caused by high-cycle (low magnitude) loads and low-cycle (high magnitude) loads. In this scenario, which is typical for industrial piping, the high-cycle load is a low magnitude force such as a vibratory force and must be resisted, while the low-cycle load is a high magnitude force such as thermal expansion/contraction and must be accommodated.

FIGS. 3-7 generally illustrate various views of a preferred embodiment of a slide bearing support system 40 for industrial piping. The inventive support system provides thermal support in combination with anti-vibration support. A structural support such 20 as an I-beam includes an upright central web 27 between a horizontal upper flange or support surface 23 and a horizontal lower flange 25. A fixed upper slide pad 42 is centered on the top side of the I-beam support surface 23, beneath the pipe 15 to be supported. An anti-vibration clamp 44 is typically secured to the I-beam 20 by a pair of nuts 41 and threaded bolts 45. A two-bolt clamp is illustrated in FIGS. 3-7, but the inventive support can comprise a four-bolt embodiment as well (e.g. see FIG. 8).

Each of the pair of threaded bolts 45 fits through the corresponding bolt pipe 47 on either side of the clamp 44, and then through an oblong slot 43 in the I-beam. A pair of fixed lower slide pads 50 and a pair of "floating" (i.e. not fixed, movable) lower slide pads 54 are placed on the underside of the I-beam support surface 23 and receive the bolts 45 through windows 52 and holes 56. As can be appreciated from viewing FIGS. 4 and 5, once the threaded bolts 45 are positioned, the bolts 41 are tightened to secure the pipe 15 between the clamp 44 and the fixed upper slide pad 42 on top of the structural support surface 23, while the fixed lower slide pads 50 and floating lower slide pads 54 are secured beneath the support surface 23. The fixed upper slide pad 42, centered under the pipe 15, is preferably in the form of a steel packer or shim. A thin contact layer 46, typically made of PTFE (i.e. Teflon) or equivalent low-friction material, is attached to or otherwise coats the top surface of the fixed upper slide pad 42. PTFE has a smooth surface for reducing the sliding friction between the contact layers, leading to sliding, low-friction contact. The fixed upper slide pad 42 is typically mechanically adhered to the I-beam 20, since thermal growth and contraction of the pipe 15 along its axis can, after several cycles, work to move the contact layer 46 out from under the pipe. For example, the wear pad 42 can be welded or glued with epoxy resin to the I-beam support surface 23.

Sliding, frictional contact between two slide pads under a normal (i.e. perpendicular) pipe load is subject to a resistant force, known as a frictional force. The frictional force between the contact layers of the slide pads always acts in the opposite direction of the actual motion, and parallel to the surface. Looking at FIGS. 3, 4, 5A and 5B, the pairs of fixed lower slide pads 50, and floating lower slide pads 54, are shown located on the underside of the I-beam support surface 23. Each fixed lower slide pad 50 can include a steel layer 51 and a low-friction contact layer 53, and each floating lower slide pad 54 can include a steel layer 57 and a low-friction contact layer 55. Similar to the contact layer 46 of the fixed upper slide pad 42, the pairs of contact layers 53 and 55 of the lower slide pads 50, 54 are typically made of PTFE or similar low-friction material. The contact layer 53 of each fixed lower slide pad 50 makes sliding, low-friction contact with the contact layer 55 of its corresponding floating lower slide pad 54.

The pair of oblong slots 43 typically must first be cut into the support surface 23 of the undergirding structure, to allow for installation of the support 40. The support surface 23 must therefore have a readily accessible underside, such as the I-beam 20 shown in FIGS. 3-7. The inventive system 40 cannot be installed directly on a concrete pier where the bolts are embedded into the concrete. The system 40 is designed for thermal growth/contraction in the direction of the oblong slots 43. Specifically, the oblong slots 43 are placed so that their long sides are perpendicular to the axis of the pipe 15 (see, e.g., FIG. 3). The oblong shape thus accommodates lateral/transverse sliding movement of the pipe 15 along the fixed upper slide pad 42 when the pipe is subjected to a thermal load. Specifically, the oblong holes 43 allow the threaded bolts 45, and thus the clamp 44 and the pipe 15, to move when the pipe 15 is expanding or contracting under a thermal load. The oblong length of each slotted hole is preferably wider than the bolt diameter (i.e., wider than about ⅛ inches) to permit lateral/transverse sliding movement of the bolts 45, the clamp 44 and the pipe 15. The specific size/length of the slots 43 can depend on the calculated thermal growth for a specific application.

Each of the fixed lower slide pads 50 include a window 52 which is also oblong in shape and substantially identical in size and oriented similarly to the oblong slots 43 cut into the I-beam. The fixed lower slide pads 50 are fixed in place to the underside of the support surface, for example, by being welded or glued with epoxy resin to underside of the I-beam 23, so that the windows 52 of the fixed lower slide pads are in a fixed orientation with the oblong slots 43. In contrast, the holes 56 of the floating lower slide pads 54 are preferably shaped to substantially conform to the outside circumference of the threaded bolts 45, so that the floating lower slide pads 54 move along with the movement of the bolts 45. As noted above, lateral/transverse sliding movement of the bolts 45 is caused by thermal expansion or contraction of the pipe 15 under a thermal load. Since each of the pair of floating lower slide pads 54 are located beneath their corresponding fixed lower slide pads 50, the contact layers 53 and 55 can slide along one another, thereby allowing transverse pipe movement.

Looking at FIGS. 3-5B, it can be appreciated that the combination of the pipe 15 and the clamp 44 form an "upper slide bearing plate", the combination of the fixed upper slide pad 42, the I-beam 20 and the pair of fixed lower slide pads 50 form a "central slide bearing plate", and the floating lower slide pads 54 form a "lower slide bearing plate". The upper slide bearing plate and the central slide bearing plate form an "upper slide plane", along which contact and movement occurs between the pipe 15 and contact layer 46 of the fixed upper slide pad 42. Similarly, the lower slide bearing plate and the central slide bearing plate form a "lower slide plane", along which contact and movement occurs between contact layers 53 of the floating lower slide pads 50 and contact layers 55 of the fixed lower slide pads 54.

The upper slide bearing plate, the central slide bearing plate and the lower slide bearing plate are brought into sliding, frictional contact with one another upon application of a torque force by the threaded bolts. As a result, movement or sliding of the central slide bearing plate with respect to the upper and lower slide bearing plates occurs when a force applied to the piping overcomes a frictional force between the upper slide bearing plate, the central slide bearing plate and the lower slide bearing plate. This frictional force resists movement of the piping under a vibratory load, but allows the piping to expand and contract under a thermal load. Further, the movement of the central slide bearing plate with respect to the upper and lower slide bearing plates is dependent upon the torque load imposed by the threaded bolts. This imposed torque load generates the frictional force between the upper slide bearing plate, the central slide bearing plate and the lower slide bearing plate.

When the inventive support 40 is installed in place on a pipe 15, the threaded bolts 45 are centered within the oblong slots 43, windows 52 and holes 56, and the nuts 41 are tightened to a specified torque value. This amount of torque loads the threaded bolt to a predictable force magnitude. As such, the friction force at the upper and lower slide planes are then predictable, based on the coefficient of friction of the contact layers 46, 53, 55 of the slide pads 42, 50, 54. The nuts 41 of the threaded bolts 45 can therefore be tightened so that the frictional loads on the upper and lower slide planes can resist pipe movement due to the high-cycle, low magnitude vibratory loads acting on the piping, yet allow the pipe to slide under low-cycle, high magnitude thermal loads. As a non-limiting example, vibratory loads are typically less than 1,000 lbf (pound-force), while thermally induced loads can reach 10,000 lbf and more. Thus, the friction load on the slide planes can be set to exceed the 1,000 lbf required to resist vibratory loads but less than the 10,000 lbf so as to accommodate thermal expansion/contraction of the piping. As a result, the pipe 15 will not vibrate or otherwise move until the frictional load placed on the upper and lower slide planes is exceeded, i.e. by a thermal load, at which point the bolts 45 move within the oblong slots 43 which causes movement along the upper slide plane (i.e. the pipe 15 is free to slide along the contact layer 46 of the fixed upper slide pad 42) and the lower slide plane (i.e. the contact layers 55 of the floating lower slide pads 54 are free to slide along the contact layers 53 of the fixed lower slide pads 50).

The steel for the fixed upper slide pad 42, the fixed lower slide pads 50 and floating lower slide pads 54 can be cut to size out of off-the-shelf sheet and plate steel. Their corresponding contact layers 46, 53, 55, typically made of polytetrafluoroethylene (PTFE), can be bonded to the steel slide pads 42, 50, 54, as specified herein. Materials other than PTFE can also be used for the contact layers, so as to change the load carrying capacity of the slide pads, change the coefficient of friction, or accommodate corrosion concerns (e.g. stainless steel on PTFE, ceramic plate on stainless steel). The width of the lower slide pads 50, 54 should be sized such that the total load/contact area is adequate to keep stress on the contact layers 53 and 55 in an acceptably low range and thus prevent plastic deformation of the pads. As a result, the lower slide pads 50, 54 are typically rectangular rather than circular in shape, and have a significant width dimension. In order to keep alignment of the lower slide pads 50, 54 during sliding movement, each fixed lower slide pad 50 preferably includes a lip 60 formed on one of the long edges (parallel to slide direction), to preserve the fixed orientation with its corresponding floating lower slide pad 54. Each lip 60 can be shaped or created using a brake press or equivalent, and ensures that the long edge of the floating lower slide pad 54 does not slide past the long edge of the upper slide pad 50. The thickness of the floating lower slide pads 54 must be such that the thickness facilitates a uniform load distribution on the contact layers 53 and 55 to prevent plastic deformation under large bolt loads.

As described above, it can be appreciated that the pipe 15 acts as a floating upper slide pad, where the upper slide plane exists between the pipe 15 and the fixed upper slide pad 42. However, this contact point may be undesirable for many reasons, such as when wear on the pipe coating is a concern, or where pipe's weight/load on the fixed upper slide pad 42 is anticipated to be large. In these cases, the pipe 15 can be made to sit on a separate "floating upper slide pad" (not shown). Such a floating upper slide pad could be in the form of the various slide pads disclosed herein having low-friction contact layers, or in the form of a bearing support as is known in the art. The floating and fixed upper slide pads can be oriented with their contact layers facing one another so that they can slide over one another, the plane of which would serve to make up a new "upper slide plane" that does not include contact of the pipe 15 with the fixed upper slide pad 42, and thus eliminating unnecessary wear or damage to the pipe.

Figure 8A:
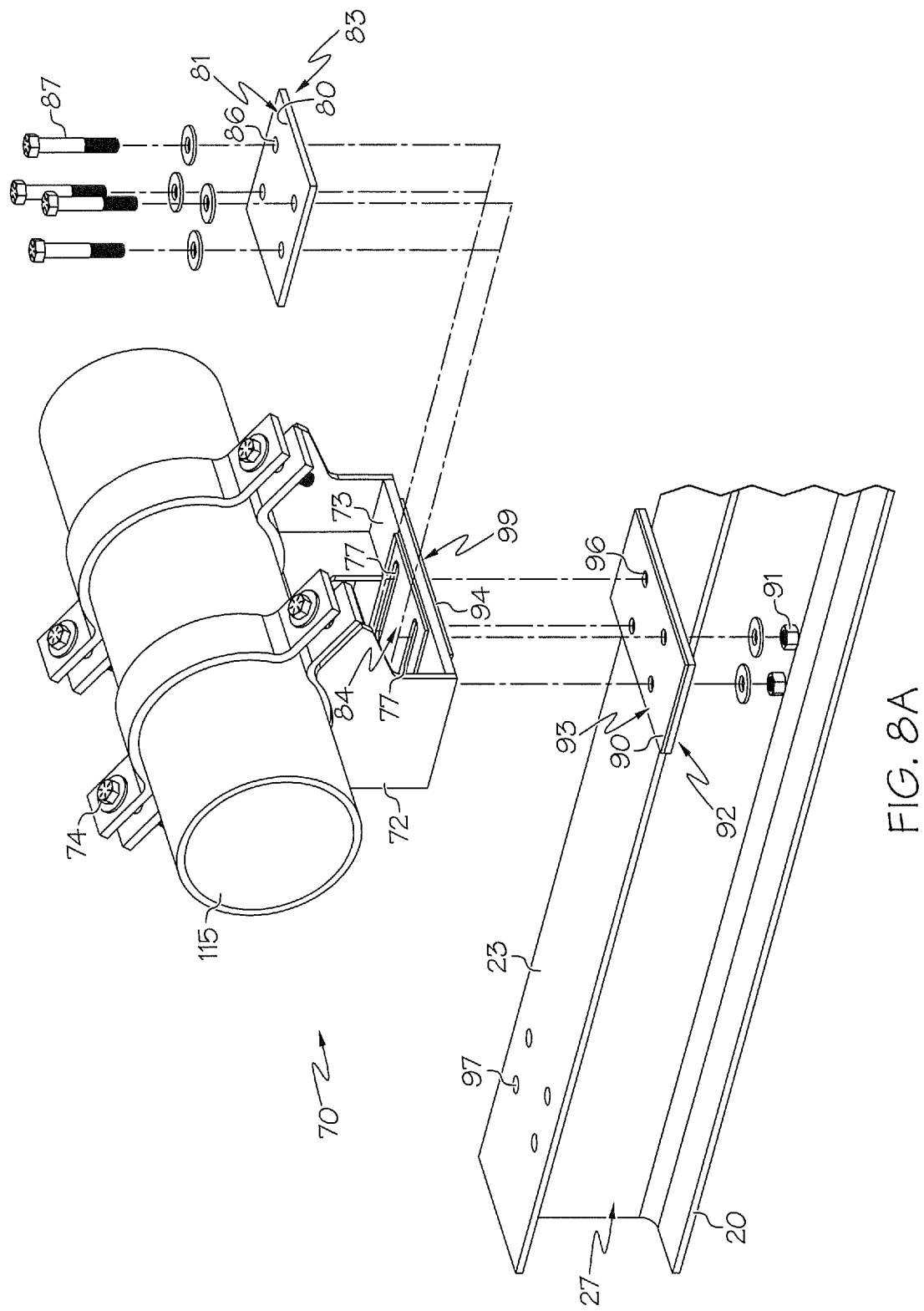
FIG. 8A is an exploded view of a second embodiment of a pipe support system according to the present invention.
Figure 8B:
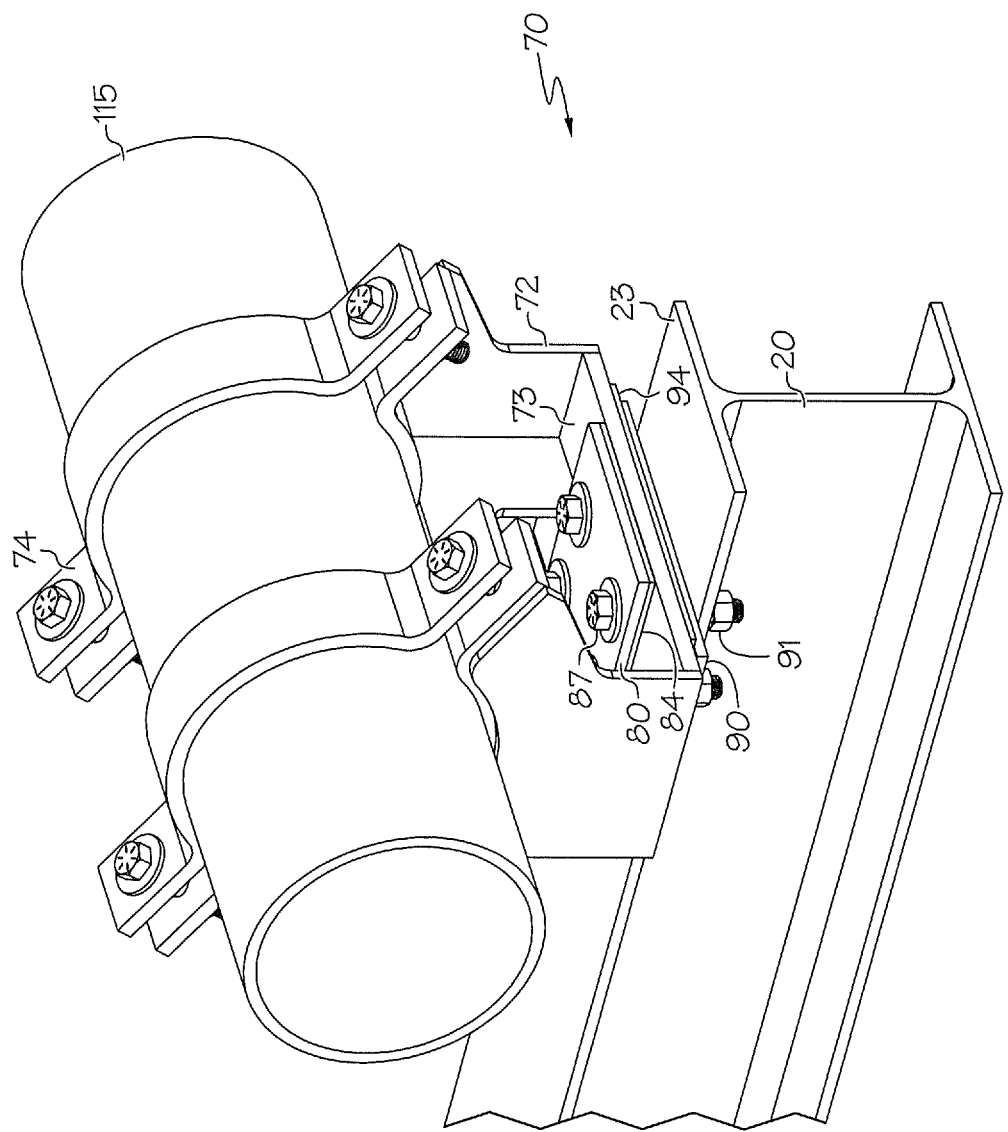
FIG. 8B is a perspective view of the support system of FIG. 8A.
Figure 9:
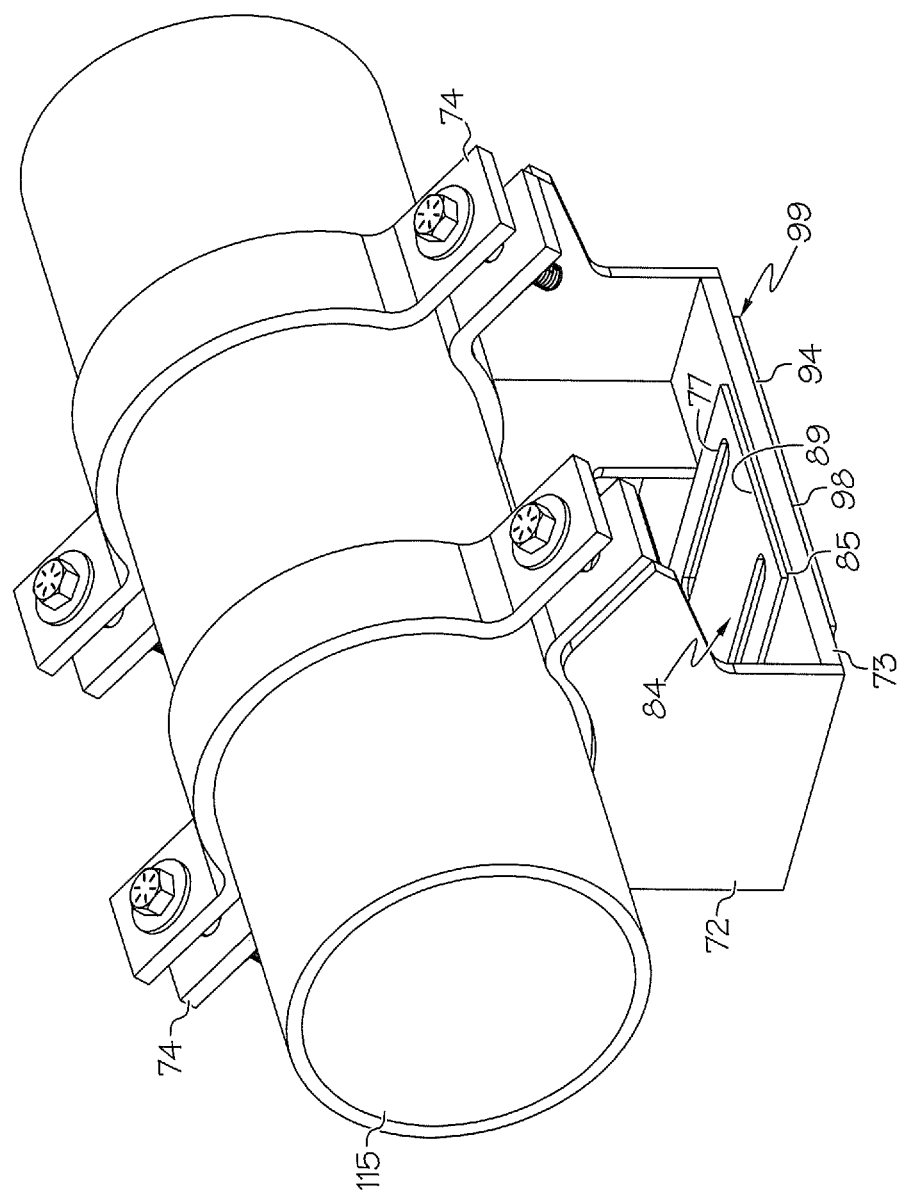
FIG. 9 is a close-up perspective view of the pipe shoe of FIG. 8A.

FIGS. 8A and 8B illustrate an exploded and a perspective view, respectively, of a second embodiment of a slide bearing support device 70 according to the present invention, and FIG. 9 is a close up view of a thermal pipe shoe or bearing support 72 of FIGS. 8A and 8B. A pipe 115 is bolted to via a clamp 74 to the top portion of the pipe shoe 72, as is well known in the art. In addition, the inventive slide bearing support system 70 further includes a fixed upper slide pad 80 (shown in FIG. 8A offset from the pipe shoe 72), a floating upper slide pad 84 centered on the top side the base 73 of the pipe shoe, a floating lower slide pad 94 centered beneath the floating upper slide pad 84 on the underside of the base 73, and a fixed lower slide pad 90 centered on the top side of the horizontal upper flange or support surface 23 of the I-beam 20.

As best seen in FIG. 8B, the fixed upper slide pad 80, the floating upper slide pad 84, the fixed lower slide pad 90, and the floating lower slide pad 94 are secured to the top side of the support surface 23 of the I-beam 20 by a set of bolts 87 with are tightened by nuts 91. The bolts 87 pass successively through holes 86 in the fixed upper slide pad 80, then through oblong slots 77 (which are cut into the floating upper slide pad 84, the base of the pipe shoe 72, and the floating lower slide pad 94), then through holes 96 in the fixed lower slide pad 90; and finally the bolts pass through holes 97 in the support surface 23 of the I-beam 20. When the system is installed as shown in FIG. 8B, the floating upper slide pad 84 contacts the fixed upper slide pad 80, and the floating lower slide pad 94 contacts the fixed lower slide pad 90, such that the pipe shoe/support 72 (and thus the pipe 115) can move when a certain coefficient of friction between the slide bearing planes is overcome.

The inventive system 70 is designed for thermal growth/contraction in the direction of the oblong slots 77. The slots 77 are located in, or cut through, the floating upper slide pad 84, the base 73 of the pipe shoe 72, and the floating lower slide pad 94. All of these elements have slots that are oblong in shape, substantially identical in size, and similarly oriented. Specifically, the oblong slots 77 are placed so that their long sides are perpendicular to the axis of the pipe 115. The oblong shape of slots 77 thus accommodates lateral/transverse sliding movement of the floating slide pads 84, 94 (and thus the pipe shoe 72 and the pipe 115) along the fixed slide pads 80, 90 when the pipe is subjected to a thermal load. More specifically, the oblong slots 77 allow the threaded bolts 87 to move when the pipe 115 is expanding or contracting under a thermal load. The oblong length of each slotted hole is preferably wider than the bolt diameter (i.e., wider than about 1/8 inches) to permit lateral/transverse sliding movement of the bolts 87, the pipe shoe 72 and the pipe 115. The specific size/length of the slots 77 can depend on the calculated thermal growth for a specific application.

The fixed upper slide pad 82 includes a steel layer 81, a low-friction contact layer 83, and a plurality of (e.g. four)

holes 86 shaped to conform to the outside circumference of a plurality of threaded bolts 87. The floating upper slide pad 84 includes a steel layer 85 mechanically adhered to the top surface of the base 73 of the pipe shoe (as best seen in FIG. 9), for example, by being welded or glued with epoxy resin. Covering the steel layer 85 is a low-friction contact layer 89 for making contact with and sliding along the low-friction contact layer 83 of the fixed upper slide pad 80. At the underside of the base 73 of the pipe shoe, the floating lower slide pad 94 is centered beneath the floating upper slide pad 84 and includes a steel layer 98 mechanically adhered to the underside of the base 73 of the pipe shoe (as best seen in FIG. 9) and a low-friction contact layer 99 for making contact with and sliding along the fixed lower slide pad 90. The fixed lower slide pad 90 includes a steel layer 92 mechanically adhered to the top side of the support surface 23 of the I-beam, a low-friction contact layer 93 for making contact with and sliding along the contact layer 99 of the floating lower slide pad 94, and a plurality of (e.g. four) holes 96 shaped to conform to the outside circumference of the plurality of threaded bolts 87.

When the system is installed as shown in FIG. 8B, the fixed upper slide pad 80 forms an "upper slide bearing plate"; the combination of the floating upper slide pad 84, the pipe shoe 72, and floating lower slide pad 94 form a "central slide bearing plate"; and the fixed lower slide pad 90 forms a "lower slide bearing plate". The upper slide bearing plate and the central slide bearing plate form an "upper slide plane", along which contact and movement occurs between the contact layer 83 of the fixed upper slide pad and the contact layer 89 of the floating upper slide pad. Similarly, the lower slide bearing plate and the central slide bearing plate form a "lower slide plane" along which contact and movement occurs between the contact layer 99 of the floating lower slide pad and the contact layer 93 of the fixed lower slide pad.

When the pipe 115 is installed in the clamp 74 of the pipe shoe 72, the bolts 87 are centered in the slots 77 and the nuts 91 are tightened to a specified torque value. This torque loads the bolt to a predictable force magnitude. The friction force at the upper and lower slide planes are then predictable, based on the coefficient of friction of the contact layer materials of the slide pads. The bolts 87 can be tightened so that the frictional loads on the upper and lower slide planes can resist pipe movement due to the high-cycle, low vibratory loads acting on the piping, yet allow the pipe to slide under low-cycle, high vibratory loads. As a result, the pipe 115 will not vibrate or otherwise move until the frictional load placed on the upper and lower slide planes is exceeded by a thermal load, at which point the bolts 87 move within the oblong slots 77, which causes movement along the upper slide plane (i.e. between the upper slide bearing plate and the central slide bearing plate) and the lower slide plane (i.e. between the central slide bearing plate and the lower slide bearing plate).

It is apparent upon reviewing the disclosure above that the slide bearing support system embodiment 40 shown in FIGS. 3-5B provides a fixed central slide bearing plate sandwiched between floating/moving upper and lower slide bearing plates. In contrast, the slide bearing support system embodiment shown in FIGS. 8-9 provides a floating/moving central slide bearing plate sandwiched in between fixed upper and lower slide bearing plates. Note that the piping 15 in the embodiment of FIGS. 3-5B is part of the floating upper slide bearing plate, while in the embodiment of FIGS. 8-9 the piping 115 is part of the floating central slide bearing plate. Each embodiment provides an upper and lower slide plane which allows the slide bearing plates to slide over one another when a thermal force of sufficient magnitude requires it, thus allowing lateral/transverse movement of the piping along the I-beam.

The steel for the slide pads described herein can be cut to size out of off-the-shelf sheet and plate steel. All steel is preferably hot dip galvanized, and all low-friction material (such as commercially available PTFE) contact layers as specified above can be epoxy bonded to the galvanized steel plates. The embodiments of the present invention can be adapted to anywhere that both thermal and vibratory loads exist between two systems (e.g. beam-to-beam connections in a structure). Different commercially available slide materials for the contact layers described herein can be used to either change the load carrying capacity, or to change the coefficient of friction (e.g. stainless steel on PTFE, Ceramic plate on stainless steel). It should be noted that the maximum temperature limit for PTFE is 205° C., and an appropriately rated epoxy should be used to mount the PTFE to steel. For best results, all I-beams should be rigidly attached to a concrete foundation with epoxy grout and anchor bolts. The anchor bolts can be either cast in the concrete or with a capsule adhesive anchor bolt or equivalent. If the I-beam support surface is not rigidly fixed, the inventive pipe support may be ineffective.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention in its broader aspects is therefore not limited to the specific details and illustrated examples shown and described. Accordingly, departures may be made from such details without departing from the scope of the invention.

What is claimed is:

1. A slide bearing pipe support for providing thermal and anti-vibrational support for industrial piping, the pipe support comprising:
   a) an upper slide bearing plate;
   b) a central slide bearing plate including a length of piping; and
   c) a lower slide bearing plate,
   wherein the pipe support connects the length of piping to a structural support via a plurality of threaded bolts, wherein the upper slide bearing plate and the central slide bearing plate are brought into sliding, frictional contact with one another upon application of a torque force by the threaded bolts, wherein the central slide bearing plate and the lower slide bearing plate are brought into sliding, frictional contact with one another upon application of the torque force by the threaded bolts, wherein movement of the central slide bearing plate with respect to the upper and lower slide bearing plates occurs when a force applied to the length of piping overcomes a frictional force between the upper slide bearing plate and the central slide bearing plate and between the central slide bearing plate and the lower slide bearing plate, and wherein said frictional force resists movement of the length of piping under a vibratory load but allows the length of piping to expand and contract under a thermal load.

2. The pipe support of claim 1, wherein the movement of the central slide bearing plate with respect to the upper and lower slide bearing plates is dependent upon the torque force imposed by the threaded bolts, and wherein the torque force generates the frictional force between the upper slide bearing plate, the central slide bearing plate and the lower slide bearing plate.

3. The pipe support of claim 2, wherein the frictional force between the upper slide bearing plate, the central slide bearing plate and the lower slide bearing plate exceeds 1,000 lbf in order to resist movement of the length of piping under the vibratory load, and wherein said frictional force between the slide bearing plates is less than 10,000 lbf in order to accommodate thermal expansion and contraction of the length of piping under the thermal load.

4. The pipe support of claim 1, the structural support including a horizontal support surface with a top side and an underside, wherein the upper slide bearing plate comprises a fixed upper slide pad, wherein the central slide bearing plate comprises the combination of:
   i) a pipe shoe having a base with a top side and an underside;
   ii) a floating upper slide pad centered on the tope side of the base; and
   iii) a floating lower slide pad centered beneath the floating upper slide pad on the underside of the base,
   and wherein the lower slide bearing plate comprises a fixed lower slide pad centered on the top side of the horizontal support surface.

5. The pipe support of claim 4, wherein the upper slide bearing plate and the central slide bearing plate form an upper slide plane along which contact and movement occurs between the fixed upper slide pad and the floating upper slide pad, and wherein the lower slide bearing plate and the central slide bearing plate form a lower slide plane along which contact and movement occurs between the floating lower slide pad and the fixed lower slide pad.

6. The pipe support of claim 4, wherein each of the fixed upper slide pad, the floating upper slide pad, the floating lower slide pad and the fixed lower slide pad comprises a contact layer made of a low-friction material, wherein the contact layer of the fixed upper slide pad makes sliding, frictional contact with the contact layer of the floating upper slide pad, and wherein the contact layer of the floating lower slide pad makes sliding, frictional contact with the contact layer of the fixed lower slide pad.

7. The pipe support of claim 4, wherein each of the fixed upper slide pad, the floating upper slide pad, the floating lower slide pad, and the fixed lower slide pad are rectangular in shape and sized to facilitate uniform stress load distribution on said respective contact layers.

8. A slide bearing pipe support for providing thermal and anti-vibrational support for industrial piping, the pipe support comprising:
   a. an upper slide bearing plate;
   b. a central slide bearing plate including a length of piping; and
   c. a lower slide bearing plate,
   wherein the pipe support connects the length of piping to a structural support via a plurality of threaded bolts, the structural support including a horizontal support surface with a top side and an underside, wherein the upper slide bearing plate comprises a fixed upper slide pad, wherein the central slide bearing plate comprises the combination of:
   i) a pipe shoe having a base with a top side and an underside;
   ii) a floating upper slide pad centered on the tope side of the base; and
   iii) a floating lower slide pad centered beneath the floating upper slide pad on the underside of the base,
   wherein the lower slide bearing plate comprises a fixed lower slide pad centered on the top side of the horizontal support surface, wherein the upper slide bearing plate and the central slide bearing plate are brought into sliding, frictional contact with one another upon application of a torque force by the threaded bolts, wherein the central slide bearing plate and the lower slide bearing plate are brought into sliding, frictional contact with one another upon application of the torque force by the threaded bolts, wherein movement of the central slide bearing plate with respect to the upper and lower slide bearing plates occurs when a force applied to the length of piping overcomes a frictional force between the upper slide bearing plate and the central slide bearing plate and between the central slide bearing plate and the lower slide bearing plate, and wherein said frictional force resists movement of the length of piping under a vibratory load but allows the length of piping to expand and contract under a thermal load.

9. The pipe support of claim 8, wherein the upper slide bearing plate and the central slide bearing plate form an upper slide plane along which contact and movement occurs between the fixed upper slide pad and the floating upper slide pad, and wherein the lower slide bearing plate and the central slide bearing plate form a lower slide plane along which contact and movement occurs between the floating lower slide pad and the fixed lower slide pad.

10. The pipe support of claim 8, wherein each of the fixed upper slide pad, the floating upper slide pad, the floating lower slide pad and the fixed lower slide pad comprises a contact layer made of a low-friction material, wherein the contact layer of the fixed upper slide pad makes sliding, frictional contact with the contact layer of the floating upper slide pad, and wherein the contact layer of the floating lower slide pad makes sliding, frictional contact with the contact layer of the fixed lower slide pad.

* * * * *